H. J. LAKE.
Cultivator.
No. 30,737.
Patented Nov. 27, 1860.
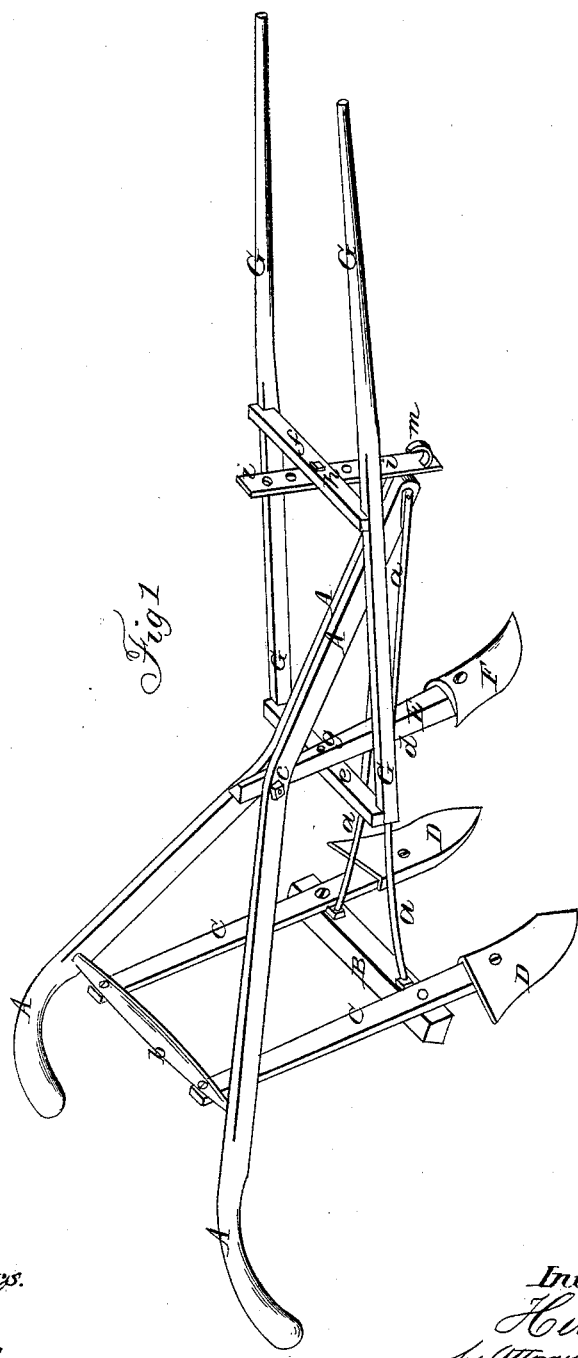

UNITED STATES PATENT OFFICE.

HIRAM J. LAKE, OF CONQUEST, NEW YORK.

IMPROVEMENT IN CULTIVATORS.

Specification forming part of Letters Patent No. 30,737, dated November 27, 1860.

*To all whom it may concern:*

Be it known that I, HIRAM J. LAKE, of Conquest, in the county of Cayuga and State of New York, have invented certain new and useful Improvements in Cultivators; and I do hereby declare the following to be a full, clear, and exact description of the construction and operation of the same, reference being had to the accompanying drawing, making a part of this specification, in which—

Figure 1 represents a perspective view of the cultivator.

In cultivating corn or other plants in rows and upon hill-sides, when thills are used in the ordinary well-known way they gouge into the sides of the horse and make it exceedingly uncomfortable for the horse, as well as for the attendant who guides the machine, as the cultivator will not run straight, but must be forced up to the rows.

The object of my invention is to avoid the difficulty heretofore encountered with stiff thills; and it consists in swiveling or pivoting the thills to the cultivator-frame, so that they will be on a level, though the cultivator may be moving on a hill-side, and thus relieve the horse from the pressure or gouging of the thills upon his side and enabling the attendant to better guide and direct the cultivator with regard to the rows of plants to be cultivated.

To enable others skilled in the art to make and use my invention, I will proceed to describe the same with reference to the drawings.

*a a* are two iron rods, fastened at their front ends to the points of the handles A A and at their rear ends to the cross-bar B.

C C are a pair of standards or stocks, connected at their tops to the rung *b*, and lower down to the cross-bar B, and having at their extreme lower ends wings D D. The stocks or standards C should be secured by screws, key-bolts, or any suitable fastening that will admit easy removal and replacement.

E is a third stock or standard, fastened at *c* to the handles A A and to the rods or bars *a a* at *d*, said bars *a* serving the purpose of a beam. The lower end of the standard E is furnished with a shoe, F, centrally located thereon, while the wings D D on the other standards project from their sides, or are at one side of their respective standards.

G are the thills, and *ef* the thill-braces. The one, *e*, is pivoted or swiveled at *g* to the standard E, and the other, *f*, is similarly swiveled at *h* to an upright bar, *i*, that is connected with or stands over the clevis *m*, though it may be connected to the beam or the bars *a a*, said bar *i*, for convenience, being furnished with adjusting-holes, into which the swiveling-pin *h* may be placed to raise or lower the thills.

The wings D and their standards or stocks C, as arranged on the drawing, will throw the earth to the sides or away from the center. By detaching and reversing them side for side they will throw the earth together or toward the center, so that they can be used for throwing the earth to or from the rows of plants, as may be preferred.

Having thus fully described my invention, what I claim as new, and desire to secure by Letters Patent, is—

In combination with a cultivator, the swiveling of the thills thereto, so that they may assume a horizontal position when the cultivator is working on a hill-side, for the purpose of relieving the horse from the pressure or gouging of the thills on his sides and enable the operator to the better guide and direct the cultivator, as set forth and described.

HIRAM J. LAKE.

Witnesses:
WILLIAM EARL,
G. H. CARR.